(12) United States Patent
Johnson et al.

(10) Patent No.: US 10,540,227 B2
(45) Date of Patent: Jan. 21, 2020

(54) SEQUENTIAL MEMORY ACCESS ON A HIGH PERFORMANCE COMPUTING SYSTEM

(71) Applicant: Hewlett Packard Enterprise Development LP, Houston, TX (US)

(72) Inventors: Charles Johnson, San Jose, CA (US); Onkar Patil, Raleigh, NC (US); Mesut Kuscu, Dornach-Aschheim (DE); Tuan Tran, Palo Alto, CA (US); Joseph Tucek, Ft. Collins, CO (US); Harumi Kuno, Cupertino, CA (US); Milind Chabbi, Palo Alto, CA (US); William Scherer, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 129 days.

(21) Appl. No.: 15/861,381

(22) Filed: Jan. 3, 2018

(65) Prior Publication Data

US 2019/0205205 A1 Jul. 4, 2019

(51) Int. Cl.
*G06F 12/06* (2006.01)
*G06F 11/08* (2006.01)
*G06F 12/02* (2006.01)

(52) U.S. Cl.
CPC ............ *G06F 11/08* (2013.01); *G06F 12/023* (2013.01); *G06F 12/06* (2013.01); *G06F 2212/1032* (2013.01)

(58) Field of Classification Search
CPC ................................. G06F 11/08; G06F 12/06

USPC ........................................................ 711/154
See application file for complete search history.

(56) References Cited

U.S. PATENT DOCUMENTS

| 5,661,848 | A | * | 8/1997 | Bonke | G06F 3/0601 |
| | | | | | 360/48 |
| 7,817,634 | B2 | | 10/2010 | Coffman et al. | |
| 9,383,932 | B2 | | 7/2016 | Das Sharma et al. | |
| 2002/0013916 | A1 | * | 1/2002 | Mann | G06F 11/1076 |
| | | | | | 714/6.24 |

(Continued)

OTHER PUBLICATIONS

Symmetric Computing, Distributed Symmetric Multi-processing (DSMP), (White Paper), Symmetric Computing, Venture Development Center, University of Massachusetts—Boston, 2012, 13 Pgs.

(Continued)

*Primary Examiner* — Jae U Yu
(74) *Attorney, Agent, or Firm* — Hewlett Packard Enterprise Patent Department (57) ABSTRACT

A high performance computing system including processing circuitry and a shared fabric memory is disclosed. The processing circuitry includes processors coupled to local storages. The shared fabric memory includes memory devices and is coupled to the processing circuitry. The shared fabric memory executes a first sweep of a stencil code by sequentially retrieving data stripes. Further, for each retrieved data stripe, a set of values of the retrieved data stripe are updated substantially simultaneously. For each retrieved data stripe, the updated set of values are stored in a free memory gap adjacent to the retrieved data stripe. For each retrieved data stripe, the free memory gap is advanced to an adjacent memory location. A sweep status indicator is incremented from the first sweep to a second sweep.

20 Claims, 8 Drawing Sheets

(56) References Cited

U.S. PATENT DOCUMENTS

2007/0186062 A1* 8/2007 Bruner .................. G06F 21/10
  711/154
2013/0304775 A1 11/2013 Davis et al.
2016/0283303 A1 9/2016 Sharma et al.

OTHER PUBLICATIONS

Chakrabarti et al., "Atlas: Leveraging locks for non-volatile memory consistency", In Proceedings of the 2014 ACM International Conference on Object Oriented Programming Systems Languages & Applications, OOPSLA '14, pp. 433-452.
Coburn et al., "NV-Heaps: Making Persistent Objects Fast and Safe with Next-generation, Non-volatile Memories", ASPLOS XVI Proceedings of the sixteenth international conference on Architectural support for programming languages and operating systems, Mar. 2011, 13 pages.
H. P. Anvin, "The mathematics of RAID-6", May 2009, 10 pages.
Plank et al., "Jerasure: A library in c facilitating erasure coding for storage applications—version 2.0.", Technical report, Technical Report UT-EECS-14-721, University of Tennessee, 2014, pp. 1-37.
Plank et al., "Screaming fast galois field arithmetic using intel simd extensions", FAST'13 Proceedings of the 11th USENIX conference on File and Storage Technologies, 2013, pp. 299-306.
Volos et al., "Mnemosyne: Lightweight persistent memory", SIGPLAN Not., 47(4):91-104, Mar. 2011.

* cited by examiner

SEQUENTIAL MEMORY ACCESS ON A HIGH PERFORMANCE COMPUTING SYSTEM

BACKGROUND

In certain example high performance computing (HPC) systems, large sets of data are stored in a shared fabric memory and are modified by processing circuitry in a sequential pattern. The large amount of data may be stored across multiple memory devices, and may be stored such that if a certain proportion of the data is corrupted, it can be restored to its original form using error correcting algorithms. When modifying portions of the large sets of data, saving the modified data in place can complicate recovering from malfunctions of components of the HPC system. In some HPC systems, the modified data is saved to a different location than the original data.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

It is appreciated that certain examples of this disclosure have features that are in addition to or in lieu of the features illustrated in the above-referenced figures. Certain labels may be omitted from certain figures for the sake of clarity.

DETAILED DESCRIPTION

In certain high performance computing (HPC) systems, the system includes processing circuitry (i.e. a pool of processors) and a shared fabric memory. The shared fabric memory has the capacity to store large amounts of data, often too much to be modified all at once by the processing circuitry. In some examples, data is formatted as a matrix, and is separated into blocks (sometimes called "subgrids"), each of which can be modified substantially simultaneously by the processing circuitry. The data may be stored in the shared fabric memory in such a way that each subgrid is stored in a different region (called a "stripe") of the shared fabric memory. In some examples, a portion of each stripe (called a "memory block") is located on each of the multiple memory devices that comprise the shared fabric memory. Each memory block of a stripe may be located in the same respective location of its memory device as the other memory blocks of the stripe.

Due to the large amount of data and the complex nature of HPC systems, data reliability and recoverability may involve a reduced frequency of full data backups and use of data write techniques and data storage frameworks that provide recoverability without requiring frequent data backups. For example, a HPC system can encode a data stripe in RAID-6, including dual parity to allow recovery of data in the case of two memory failures. An example HPC system may also updated stripes out-of-place, writing the updated data for a stripe to a different memory location than the original data resided in.

In certain examples, the data stored in the shared fabric memory is updated in a sequential manner. For instance, the data may represent a physical region in a simulation that is updated using a stencil code, and each update pass through the data (called a "sweep" or a "timestep") represents moving from a first point in time during the simulation to a second point in time during the simulation. Some example HPC systems executing updates in a sequential manner may organize the data in the shared fabric memory to reside in successive stripes so that each successive stripe in the shared fabric memory contains the next subgrid or subgrids to be updated by the processing circuitry.

In certain example HPC systems, the shared fabric memory includes a free memory gap to where the updated data for the current subgrid being updated is written. An example free memory gap includes a stripe location that is kept free, with no current data stored in the stripe location. Once the processing circuitry updates a subgrid, the resultant data is written to the stripe location in the free memory gap, and the location of the free memory gap is moved to the next offset. Since the execution of the processing circuitry is done in a sequential manner, the free memory gap ripples (i.e. moves stepwise from one end of the shared fabric memory to the opposite end) across the stripes. Once the current sweep data of a subgrid is written to the free memory gap, the shared memory fabric is configured so that stepping the free memory gap to the next stripe locates the free memory gap on a stripe including the previous sweep data of the subgrid that was just written. Although this description of the operation of the free memory gap describes a single subgrid located in a single stripe updated by a single sweep, this disclosure contemplates the free memory gap including any number of stripes, each stripe including any number of subgrids, and the processing circuitry updating data by any number of sweeps prior to writing to the shared fabric memory.

Figure 1A:
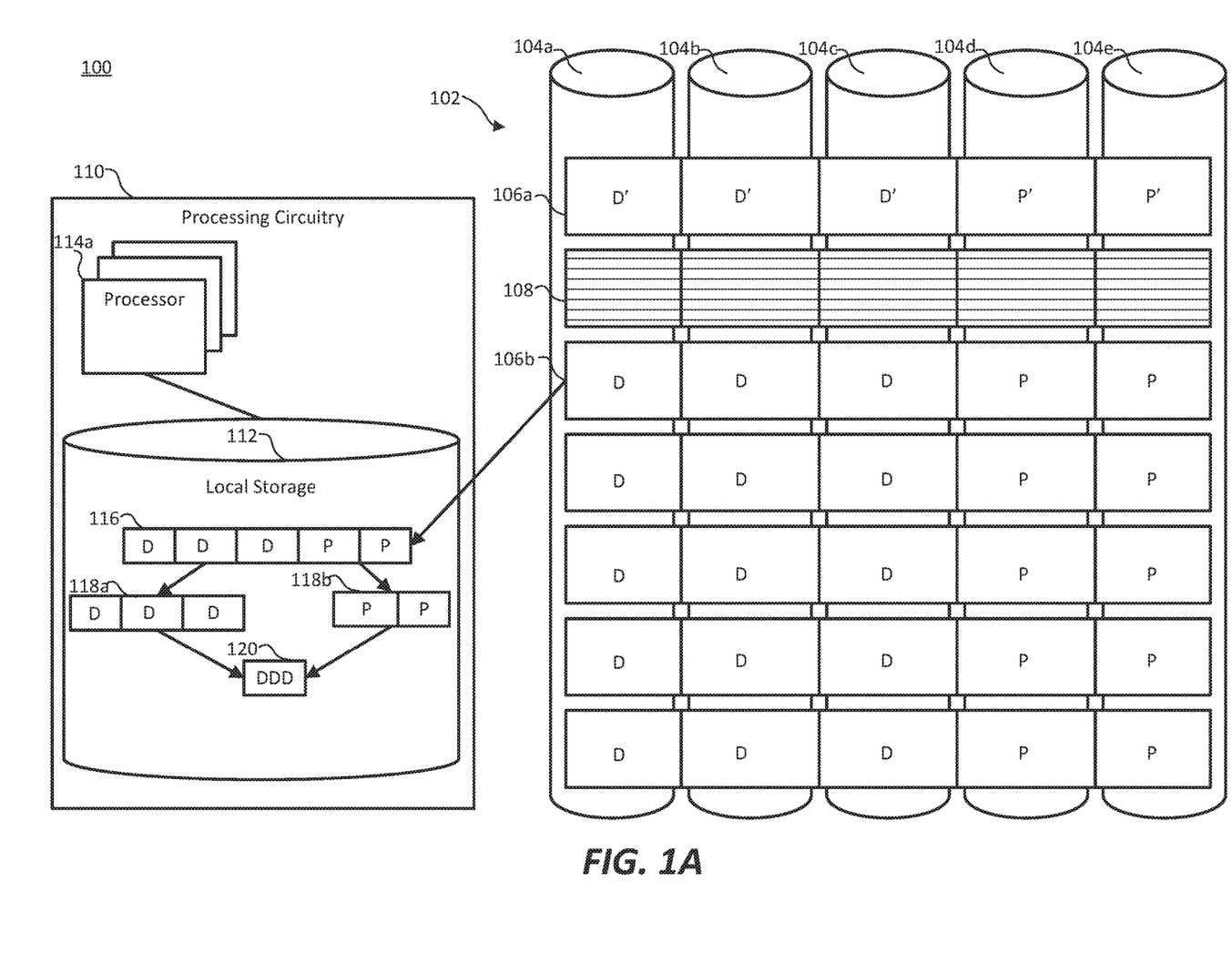
FIGS. 1A-1B illustrate an example HPC system updating a stripe of data.

FIG. 1A illustrates an example HPC system including a shared fabric memory coupled to processing circuitry. HPC system 100 includes a shared fabric memory 102 coupled to processing circuitry 110. Shared fabric memory 102 includes memory devices 104*a-e*. Five memory devices are shown in FIG. 1A, but any number of memory devices is contemplated by this disclosure. Stripes 106*a-b* are included in shared fabric memory 102. Each stripe 106 spans across memory devices 104*a-e*, and the respective memory blocks of each stripe 106 are located at the same offset in each respective memory device 104. Labels of certain stripes 106 are omitted for clarity's sake. A free memory gap 108 is located between stripes 106*a* and 106*b*.

Processing circuitry 110 includes local storages 112 (only one is illustrated in FIG. 1A) and processors 114, including processor 114*a* coupled to local storage 112. Local storage 112 stores subgrid data 116 from stripe 106*b*, which includes data portion 118*a* and parity portion 118*b*. Processor 114*a* determines the data 120 based on data portion 118*a* and parity portion 118*b*. In some examples, shared fabric memory 102 includes processing circuitry that preprocesses stripe 106b to determine data 120 based on data portion 118a and parity portion 118b, forwarding data 120 to local storage 112.

HPC system 100 iterates through stripes 106 to update them to the current sweep (represented by an apostrophe in each memory block of the stripe). Stripe 106a has been updated to the current sweep, and free memory gap 108 has been located where the data for the prior sweep of the subgrid stored in stripe 106a was located. Stripe 106b is loaded into local storages 112 for updating. In some examples, portions of stripe 106b are loaded into each local storage 112 as partial subgrid data 116, and the respective processors 114 update each partial subgrid data 116 independently of one another before reassembling updated data to be written to shared fabric memory 102. In some other examples, local storage 112 is coupled to multiple processors 114, and portions of partial subgrid data 116 is updated by each processor 114. In yet other examples, local storage 112 stores all of stripe 106b as subgrid data 116, and all processors 114 retrieve their respective portions for updating from local storage 112. In further other examples, local storage 112 includes a portion universal to all processors 114 and a portion individual to each processor 114, and subgrid data 116 is apportioned to each individual portion of local storage 112 as appropriate for processors 114 to update their respective portions of subgrid data 116. Although local storage 112 has been described as separate from processors 114, local storage 112 may comprise multiple levels of storage, including on-processor cache, RAM, and other appropriate storage media. In certain examples, some processors 114 are dedicated to tasks other than updating portions of subgrid data 116, including assembling the updated data into a form usable by shared fabric memory 102, calculating parity data for the updated data, monitoring the processes running on other processors 114 for health and completion, and other appropriate tasks.

Subgrid data 116 includes data blocks retrieved from a first set of memory devices 104 of shared fabric memory 102. Specifically, data portion 118a is retrieved from memory devices 104a-c. Likewise, parity blocks are retrieved from a second set of memory devices 104 of shared fabric memory 102. Specifically parity portion 118b is retrieved from memory devices 104d-e. In some examples, data portion 118a of each stripe 106 is retrieved from the same set of memory devices 104a-c and parity portion 118b of each stripe 106 is retrieved from the same set of memory devices 104d-e. In such examples, all parity information 118b is stored on parity memory devices 104d-e, and all data information 118a is stored on data memory devices 104a-c. In some other examples, different stripes 106 store their data portions 118a and parity portions 118b in different sets of memory devices 104 relative to one another.

In examples where stripe 106b is forwarded to local storage 112 with parity portion 118b, processor 114a calculates data 120 based on data portion 118a and parity portion 118b. In the case where a data block has been corrupted, the data blocks of data portion 118a, in combination with the parity blocks of parity portion 118b, are used to determine the uncorrupted data.

In examples where stripe 106b is parity checked by shared fabric memory 102 prior to loading in local storage 112, a controller of shared fabric memory 102 calculates data 120 based on data portion 118a and parity portion 118b. In the case where a data block has been corrupted, the data blocks of data portion 118a, in combination with the parity blocks of parity portion 118b, are used to determine the uncorrupted data.

In some examples, HPC system 100 implements RAID-6 dual parity so that up to two corrupted data blocks can be repaired. In certain examples, the RAID-6 parity blocks are calculated using Jerasure encoding or Reed-Solomon encoding. In such examples, the canonical data (i.e. the data as intended to be written) is able to be calculated (by processing circuitry 110 in some examples and by a controller of shared fabric memory 102 in other examples) per stripe 106. By using RAID-6, the time and memory overhead of recovering a damaged stripe 106 (whether due to data corruption or device failure) is small.

Free memory gap 108 may contain data, but the data contained in free memory gap 108 is not current data. In some examples free memory gap 108 includes data from a prior sweep of HPC system 100. Free memory gap 108 is relocated once stripe 106b has been updated and the updated data is written to the current location of the free memory gap 108. The following description of an example procedure for updating stripe 106b references a single stripe 106b being updated, a single stripe-sized free memory gap 108, and free memory gap 108 relocating in single stripe increments. However, this disclosure contemplates any number of stripes 106 being updated substantially simultaneously, a free memory gap 108 of any appropriate size, and a relocation of the free memory gap 108 of any size increment.

An example HPC system 100 updates a stripe 106b as follows. A sweep iteration indicator keeps track of the current sweep iteration. Prior to update, stripe 106b is updated to a previous sweep iteration. In some examples, stripes 106 are updated multiple sweep iterations before the updated data is written back to shared fabric memory 102. In some other examples, stripes 106 are updated single sweep iterations before the updated data is written back to shared fabric memory 102. A first group of data blocks are retrieved from locations on memory devices 104a-c corresponding to stripe 106b. Also, a second group of parity blocks are retrieved from locations on memory devices 104d-e corresponding to stripe 106b. In some examples, the data blocks and the parity blocks are then transmitted to local storage 112 of processing circuitry 110 where the canonical data is calculated using the data blocks and the parity blocks. In some other examples, a controller of shared fabric memory 102 calculates the canonical data and transmits the canonical data to local storage 112. Processing circuitry 110 then updates the data and transmits updated data including updated data blocks and updated parity blocks to shared fabric memory 102. Shared fabric memory 102 then stores the updated data in free memory gap 108, relocates free memory gap 108 to the location where the previous sweep data of stripe 106b was located, which is adjacent to the current location of free memory gap 108, and begins the process of updating the next stripe 106. In some examples, stripe 106b is the last stripe of the current sweep. In such examples, rather than beginning the process of updating the next stripe, the sweep iteration indicator is incremented to the next sweep and inter-sweep instructions may be executed. The pattern of execution is sequential, resulting in a "ripple" of the currently updating stripe 106 and free memory gap 108 from one end of shared fabric memory 102 to the opposing end, and on the next sweep the ripple transits in the opposing direction.

The data blocks and the parity blocks stored on shared fabric memory 102 are uniformly sized blocks and are located at the same offset within their respective memory devices 104. For example, the memory blocks (i.e. data blocks and parity blocks) for the third stripe may be located at an address in each memory device 104 corresponding to two times (2×) the uniform size of the memory blocks. In such an example, if memory blocks are twenty (20) bytes long, each memory block for the third stripe is located at address forty (40) of their respective memory devices 104.

Figure 1B:
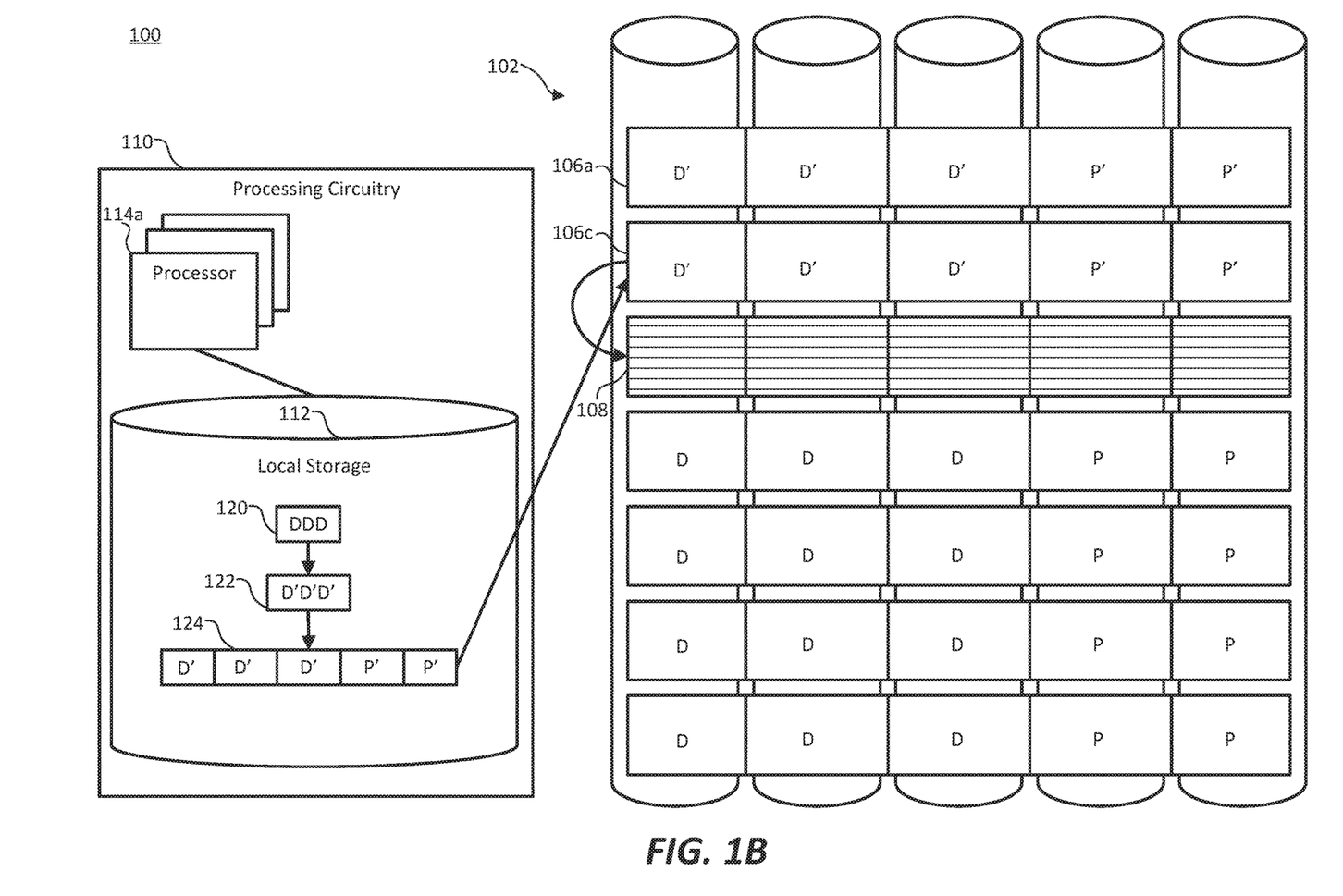

FIG. 1B illustrates HPC system 100 completing an update of stripe 106*b* and writing the updated data to shared fabric memory 102. Original data 120, retrieved from stripe 106*b*, is updated by processor 114*a* to updated data 122. In some examples, each subgrid of the matrix includes cells that are arranged in a structure (e.g. 2D rectangle, 3D cube, 3D sphere). Data 120 includes values of each cell within the subgrid stored in stripe 106*b*. In some examples, updating a value of a cell includes calculating an average of the surrounding cells (as defined by the structural arrangement of the cells) at the previous sweep. Certain cells may require data from other stripes to compute their updated value. Such cells located in a "halo region" of the subgrid may be updated using data in addition to data 120, which may be passed to processor 114*a* from a mailbox or any other appropriate data structure capable of relaying cell values from one subgrid to processing circuitry 110 while updating values of another subgrid.

Once updated data 122 is calculated by processor 114*a*, parity information is calculated and updated data 122 is assembled into memory blocks 124, which is transmitted to shared fabric memory 102 and written to free memory gap 108. Upon memory blocks 124 being written as stripe 106*c*, free memory gap 108 is relocated to stripe 106*b*, which contains the previous sweep data of the subgrid.

Figure 2:
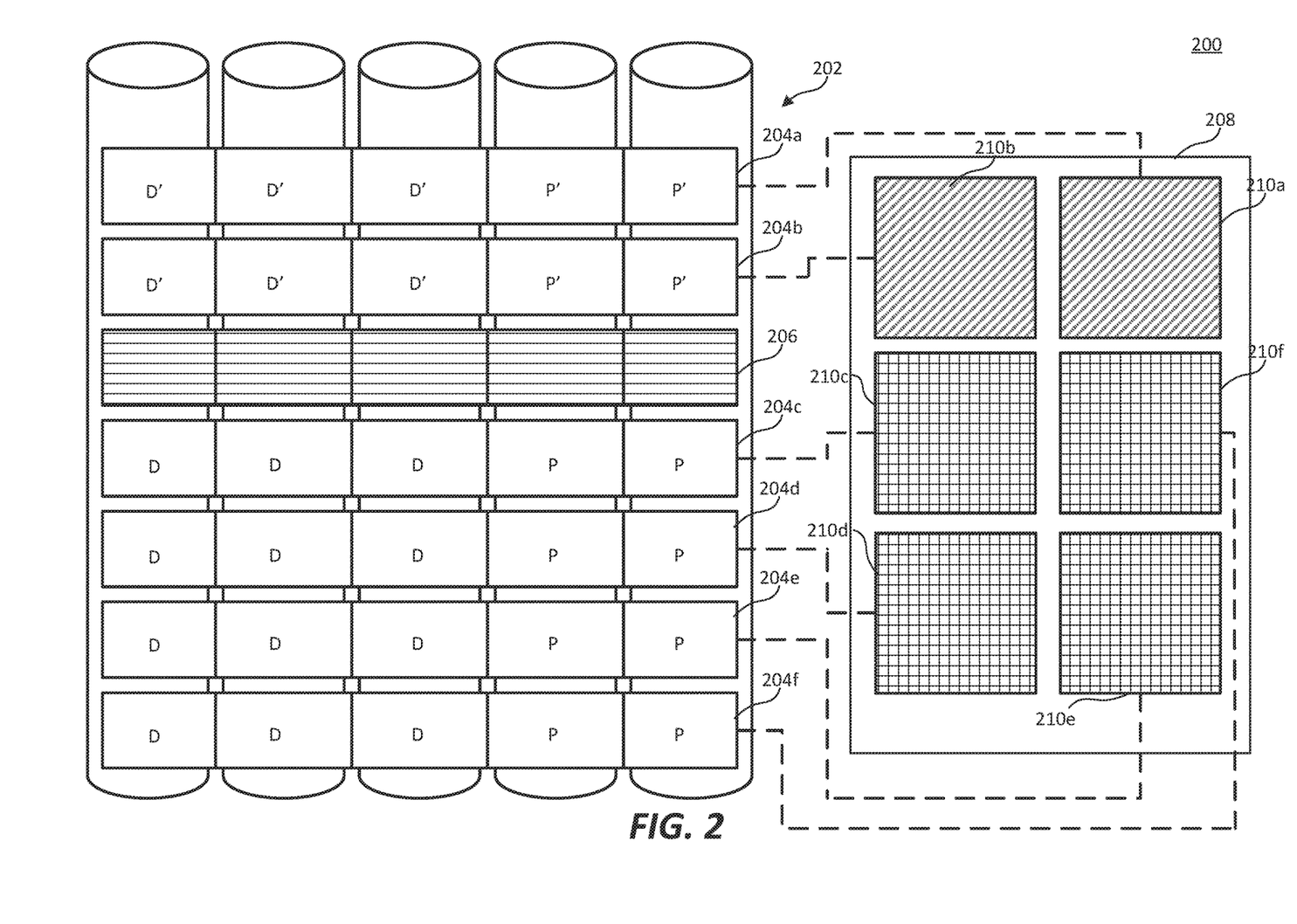
FIG. 2 illustrates an example relationship between a shared fabric memory and a data matrix.

FIG. 2 illustrates an example relation 200 between a shared fabric memory 202 and a cell matrix 208. Shared fabric memory 202 includes stripes 204*a-f* and a free memory gap 206. Free memory gap 206 is a stripe that is not populated with current data, although it may include data from previous sweeps. Each stripe contains a number of memory blocks corresponding to the number of memory devices in shared fabric memory 202. In the example of FIG. 2, each stripe 204 includes five (5) memory blocks. Each memory block is located at the same offset within each memory device as the other memory blocks of the corresponding stripe 204. For example, memory blocks of stripe 204*a* may start at address 0x00f4 of each respective memory device. Each memory device is of a uniform size throughout shared fabric memory 202. In some examples, the uniform size is a prerequisite for restoration of corrupted data. A memory block may be one of a data block and a parity block. In the example of FIG. 2, three data blocks of stripe 204*a* are combined with two parity blocks. In examples using RAID-6, dual parity allows two memory failures (corruption of a data block or parity block, or device failure) to occur and the data to be restored from the remaining uncorrupted data.

Each stripe 204 represents a subgrid 210 of cell matrix 208. Cell matrix 208 is a data structure used in sequentially and repetitively applying the same computation to a large set of values. One such computation regime is a stencil code, which applies a computation to each cell in cell matrix 208 to update the value. Each iteration of updates is called a sweep, and the updated value of each cell for the current sweep is calculated based on the value of the cell during a prior sweep as well as the values of related cells during a prior sweep. For example, the updated value of a cell may be determined by calculating the mean of the value of the cell at the previous sweep and the values of surrounding cells at the previous sweep. Cell matrix 208 is separated into subgrids 210*a-e*, each of which correspond to a respective stripe 204*a-e* of shared fabric memory 202. Each subgrid 210 is small enough to be updated substantially simultaneously by the processing circuitry of the HPC system.

As shown in the example of FIG. 2, stripes 204 are updated sequentially, as shown by apostrophes in the memory blocks, and the corresponding subgrid is also shown as updated (diagonal stripes for current sweep, cross-hatch for previous sweep). In some examples, free memory gap 206 separates updated stripes 204*a-b* from not-yet-updated stripes 204*c-f*. An example process for updating the next subgrid 210*c* is as follows. Subgrid 210*c* relates to stripe 204*c*, which is transmitted to the processing circuitry of the HPC system. The processing circuitry returns the updated data for subgrid 210*c*, which is written to free memory gap 206. With the updated data for subgrid 210*c* written to another location, stripe 204*c* is no longer relates to subgrid 210*c* and merely contains previous sweep data. Once the updated data is written to free memory gap 206, the location of free memory gap 206 is moved to stripe 204*c*. Then, the next subgrid to be updated is subgrid 210*d*, with free memory gap 206 residing between the newly inserted updated data for subgrid 210*c* and the previous sweep data of subgrid 210*d*.

In some examples, cell matrix 208 is shaped as a two dimensional rectangle (as shown in FIG. 2). In some other examples, cell matrix 208 is shaped as a three dimensional cube or a three dimensional sphere. This disclosure contemplates cell matrix 208 being shaped in any appropriate shape of any number of dimensions.

Figure 3:
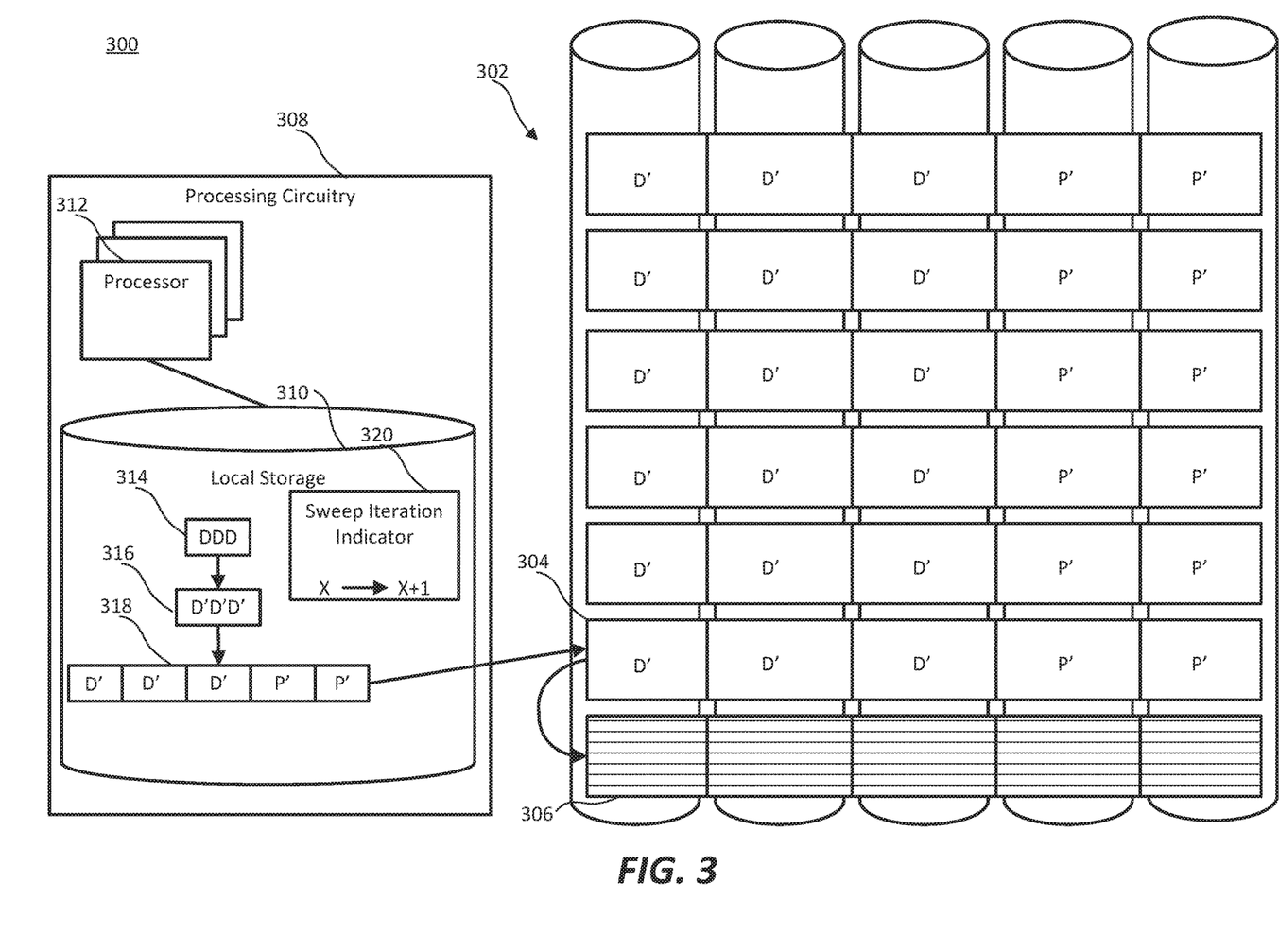
FIG. 3 illustrates an example HPC system updating a stripe of data at an end of an address space of a shared fabric memory.

FIG. 3 illustrates an example HPC system updating a stripe. HPC system 300 includes shared fabric memory 302 and processing circuitry 308. Shared fabric memory 302 includes stripe 304 and free memory gap 306. Processing circuitry 308 includes local storage 310 and processor 312. Local storage 310 includes data 314 from the stripe that is currently free memory gap 306, and sweep iteration indicator 320.

The example of FIG. 3 illustrates the update of data from a stripe of shared fabric memory 302. The original data was retained in stripe 306 prior to the free memory gap being moved to stripe 306. Processor 312 calculates updated data 316 based on original data 314 and also calculates parity blocks for memory blocks 318. Since the stripe retrieved for updating (stripe 306) is at the end of shared fabric memory 302 (which can be recognized by the movement of the free memory gap 306 in the direction of the end of shared fabric memory 302), HPC system 300 has completed the current sweep (sweep X, as indicated by sweep iteration indicator 320. This is further evidenced by the status of all of the data blocks and parity blocks of shared fabric memory 302, which are updated to the current sweep (as indicated by the apostrophes).

At the completion of a sweep, processor 312 (or another processor dedicated to management of the update process) increments sweep iteration indicator 320 from the just completed sweep (sweep X) to the next sweep (sweep X+1). Then, processing circuitry 308 executes an inter-sweep instructions, such as data backups, report compilations, or any other instructions appropriate to be executed between sweeps of a stencil code algorithm. Upon the start of sweep X+1, the ripple will reverse directions, and the free memory gap 306 will traverse the shared fabric memory 302 toward the opposite end.

Figure 4A:
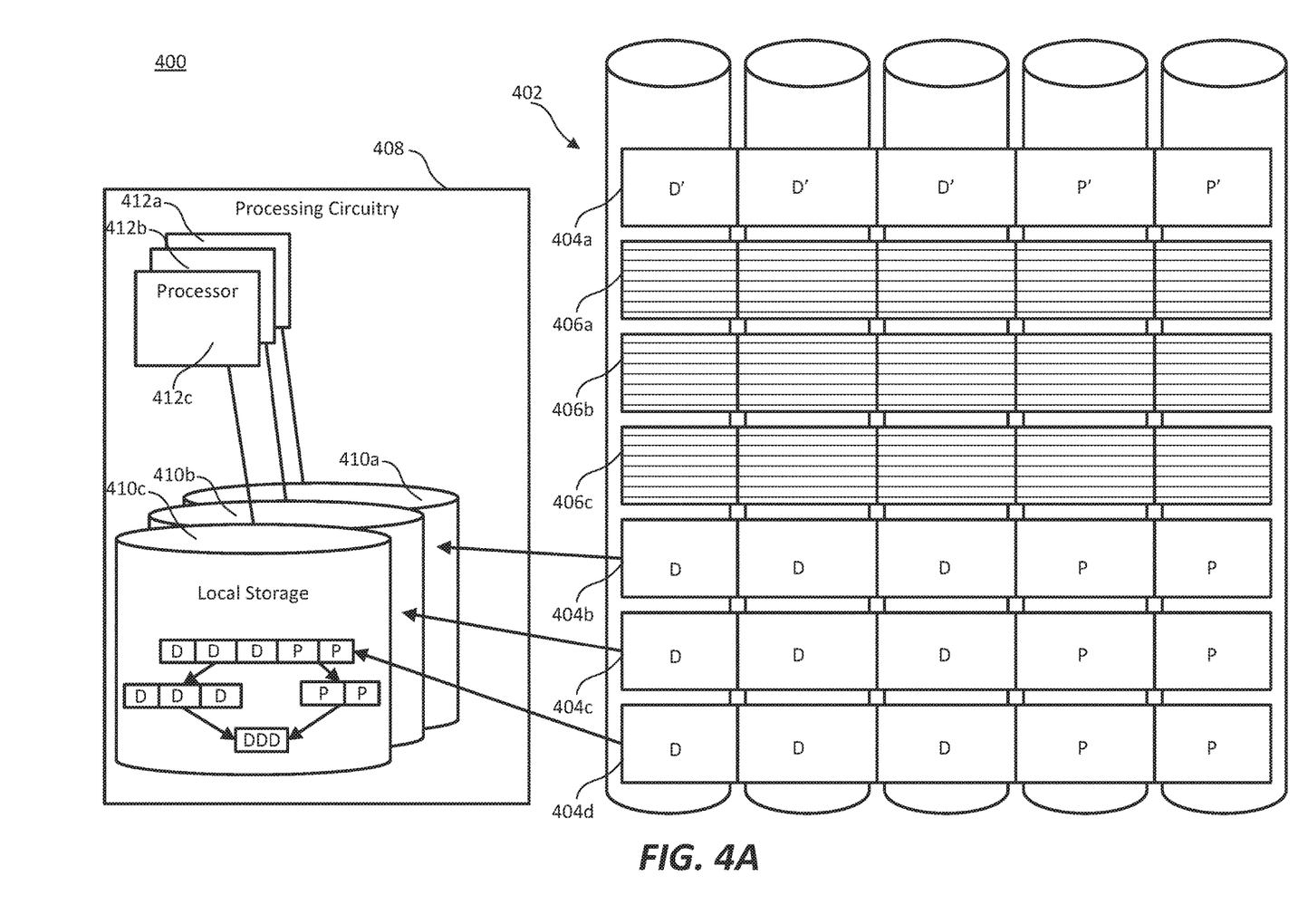
FIGS. 4A-4B illustrate an example HPC system updating stripes of data.

FIG. 4A illustrates an example HPC system that updates multiple stripes 404 substantially simultaneously. In contrast to examples such as the ones in FIGS. 1A-1B, HPC system 400 processes stripes 404*b-d* substantially simultaneously in processing circuitry 408 using local storages 410*a-c*, which are respectively coupled to processors 412*a-c*. In some examples, stripes 404*b-d* are three previous sweeps (for example, sweeps X−2, X−1, and X) of a subgrid, and processing circuitry 408 updates and writes three current sweeps (for example, sweeps X+1, X+2, and X+3) to free memory gap 406*a-c*. In some other examples, processing circuitry 408 is able to process three subgrids substantially simultaneously, and each of stripes 404*b-d* represents a different subgrid.

In examples such as FIGS. 1A-1B, processing circuitry may include multiple processors and local storages, similar to processing circuitry 408 of FIG. 4A. However, in the operation of such examples, where only one stripe is processed at a time, portions of the stripe are assigned to each processor for updating. In some examples, each processor updates one cell of the cell matrix. In some other examples, each processor executes multiple processes, each of which update one cell of the cell matrix. In contrast, the examples of FIG. 4A assign a stripe to each processor, and substantially simultaneously write the updated data for each stripe 404*b-d* to the free memory gap 406*a-c*.

Figure 4B:
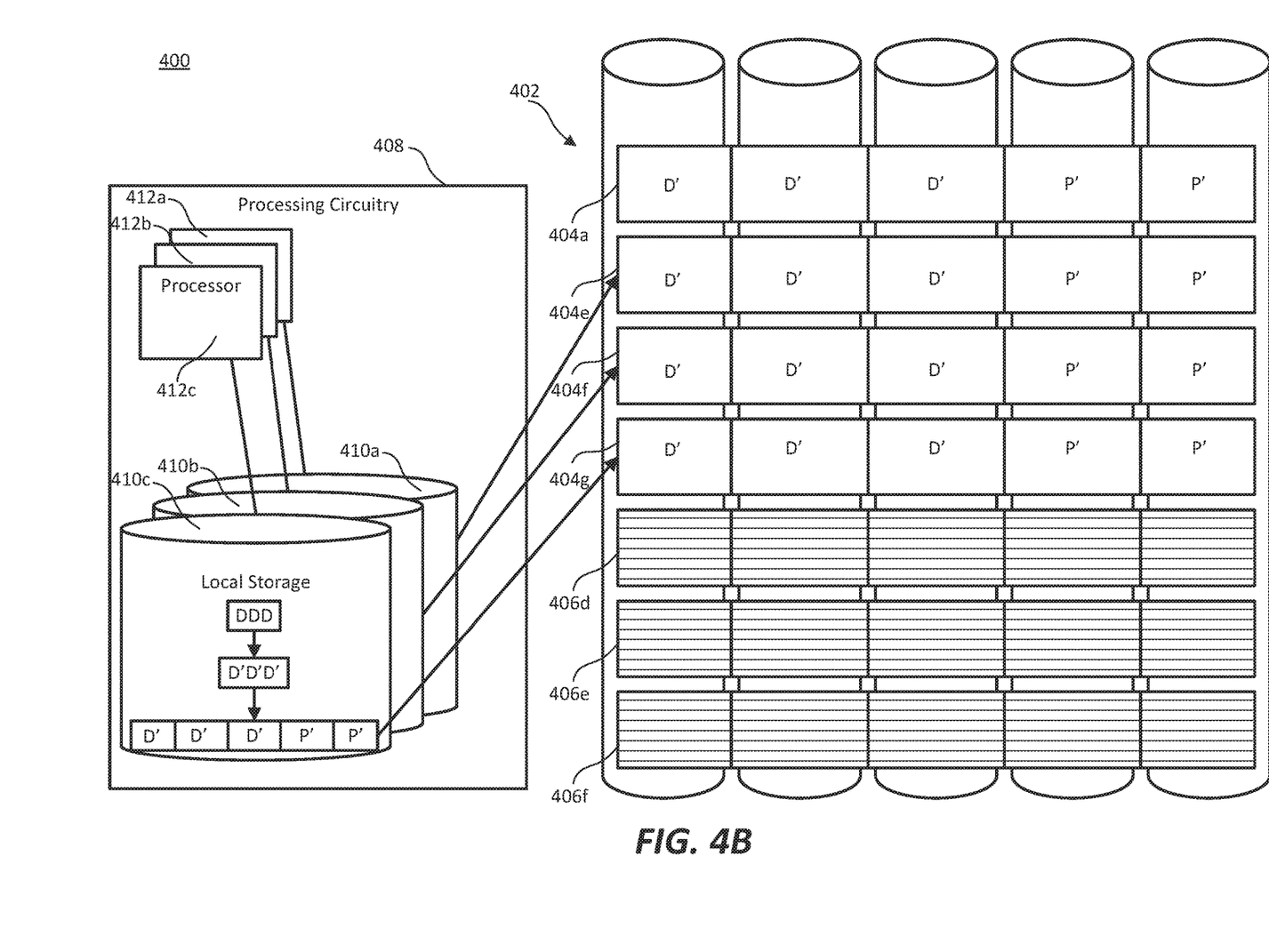

FIG. 4B illustrates HPC system 400 writing updated data to shared fabric memory 402. Once processors 412*a-c* update the data from stripes 404*b-d* (in FIG. 4A), the updated memory blocks are returned to shared fabric memory 402 and written to free memory gap 406*a-c* stripes 404*e-g*). The free memory gap is relocated to the stripes (stripes 404*b-d*) adjacent to and following the original location of the free memory gap. Free memory gap 406*d-f* is relocated to stripes 404*b-d*. The updated memory blocks (shown with apostrophes) are written to stripes 404*e-g*, resulting in the end of the current sweep.

Figure 5:
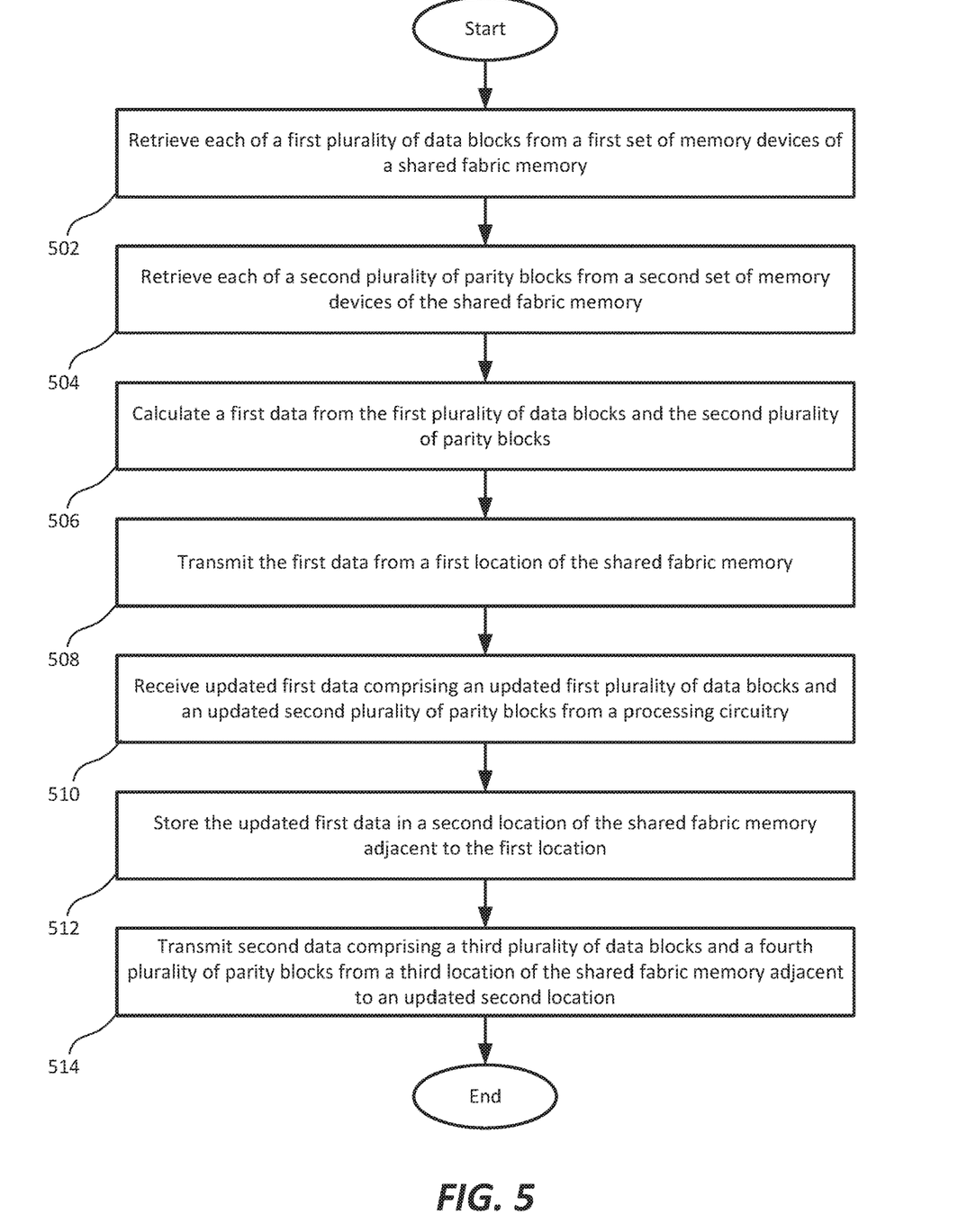
FIG. 5 is a flowchart illustrating an example method for updating a stripe of data.

FIG. 5 is a flowchart illustrating an example method for updating a stripe in a shared fabric memory.

In step 502, a first plurality of data blocks is retrieved from a first set of memory devices of a shared fabric memory. In some examples the first plurality of data blocks are retrieved by a controller of the shared fabric memory based on a request from processing circuitry of a HPC system.

In step 504, a second plurality of parity blocks is retrieved from a second set of memory devices of the shared fabric memory. In some examples, the second plurality of parity blocks are combined with the first plurality of data blocks in the controller of the shared fabric memory and transmitted to the processing circuitry of the HPC system together. In some other examples, each of the first plurality of data blocks and each of the second plurality of parity blocks are individually transmitted to the processing circuitry.

In step 506, a first data is calculated from the first plurality of data blocks and the second plurality of parity blocks. In some examples, the first data is calculated by the controller of the shared fabric memory. In some other examples, the first plurality of data blocks and the second plurality of parity blocks are transmitted to the processing circuitry to calculate the first data. In some examples, RAID-6 logic is used to reconstruct the first data from a corrupted first plurality of data blocks using the second plurality of parity blocks in combination with the first plurality of data blocks.

In step 508, the first data is transmitted from a first location of the shared fabric memory. In some examples, the first data is calculated on a controller of the shared fabric memory, and transmitted to processing circuitry after being calculated. In some other examples, first data may reside in the first plurality of data blocks and be transmitted from their location (the first location) to the processing circuitry.

In step 510, updated first data is received from the processing circuitry, wherein the updated first data includes an updated first plurality of data blocks and an updated second plurality of parity blocks. In some examples, the updated first data is sent from the processing circuitry in a format that aids the shared fabric memory in writing updated memory blocks (e.g. the updated first plurality of data blocks and the updated second plurality of parity blocks) to a stripe.

In step 512, the updated first data is stored in a second location of the shared fabric memory. The second location is adjacent to the first location. As described in other figures (FIG. 1A, for example), the free memory gap, in some examples, is located adjacent to the location of the original first data (i.e. the first plurality of data blocks and the second plurality of parity blocks). Therefore, when the updated first data is stored in the free memory gap (the second location), it is stored adjacent to the original first data (located at the first location).

In step 514, the process begins again for a second data. Second data is transmitted from a third location of the shared fabric memory adjacent to an updated location of the free memory gap (an updated second location). The updated location of the free memory gap and the location of the second data cause the execution to "ripple" through the shared fabric memory from one end to the opposite end of the shared fabric memory.

Figure 6:
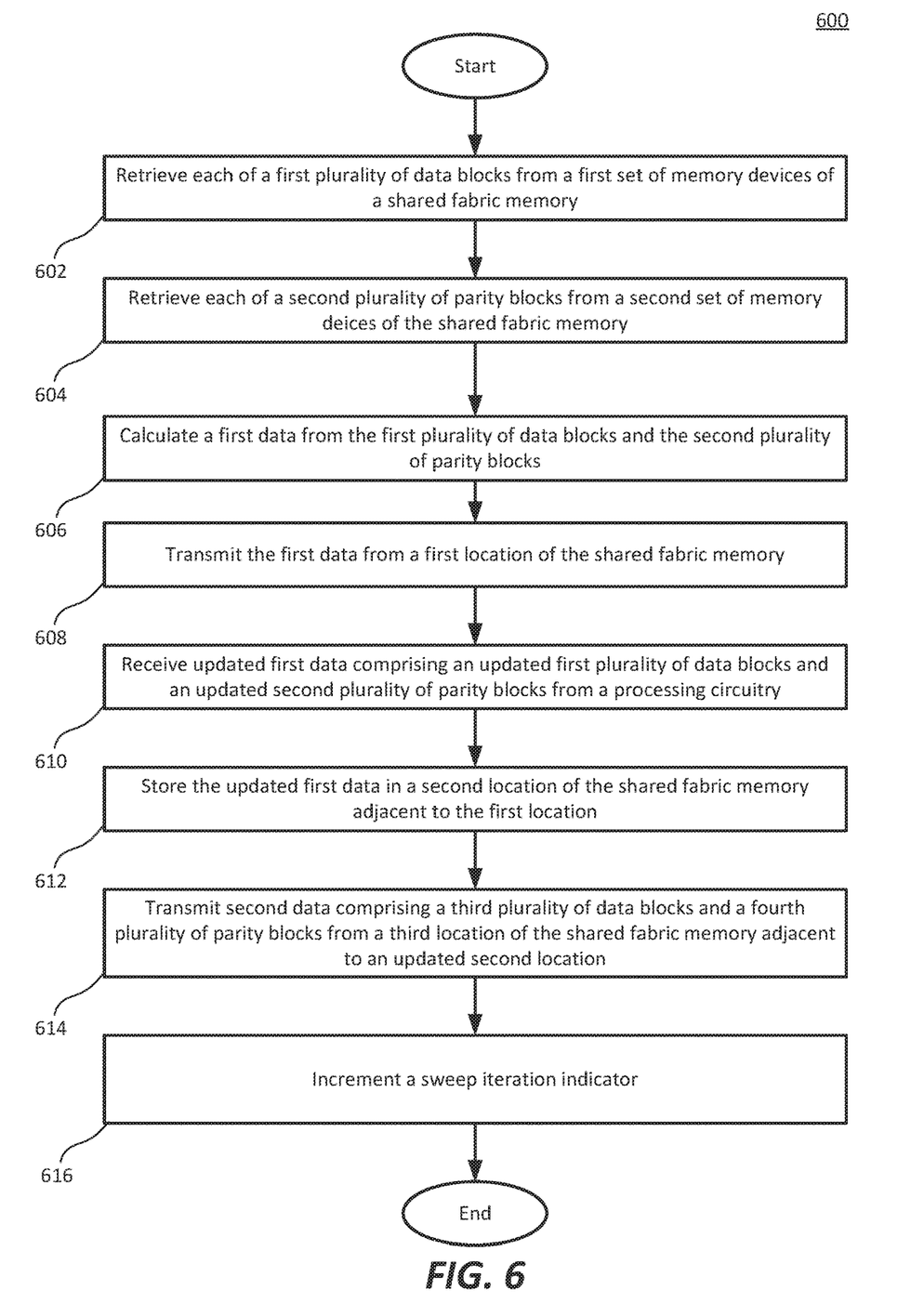
FIG. 6 is a flowchart illustrating another example method for updating a stripe of data.

FIG. 6 is a flowchart illustrating another example method for updating a stripe in a shared fabric memory.

In step 602, a first plurality of data blocks is retrieved from a first set of memory devices of a shared fabric memory. In some examples the first plurality of data blocks are retrieved by a controller of the shared fabric memory based on a request from processing circuitry of a HPC system.

In step 604, a second plurality of parity blocks is retrieved from a second set of memory devices of the shared fabric memory. In some examples, the second plurality of parity blocks are combined with the first plurality of data blocks in the controller of the shared fabric memory and transmitted to the processing circuitry of the HPC system together. In some other examples, each of the first plurality of data blocks and each of the second plurality of parity blocks are individually transmitted to the processing circuitry.

In step 606, a first data is calculated from the first plurality of data blocks and the second plurality of parity blocks. In some examples, the first data is calculated by the controller of the shared fabric memory. In some other examples, the first plurality of data blocks and the second plurality of parity blocks are transmitted to the processing circuitry to calculate the first data. In some examples, RAID-6 logic is used to reconstruct the first data from a corrupted first plurality of data blocks using the second plurality of parity blocks in combination with the first plurality of data blocks.

In step 608, the first data is transmitted from a first location of the shared fabric memory. In some examples, the first data is calculated on a controller of the shared fabric memory, and transmitted to processing circuitry after being calculated. In some other examples, first data may reside in the first plurality of data blocks and be transmitted from their location (the first location) to the processing circuitry.

In step 610, updated first data is received from the processing circuitry, wherein the updated first data includes an updated first plurality of data blocks and an updated second plurality of parity blocks. In some examples, the updated first data is sent from the processing circuitry in a format that aids the shared fabric memory in writing updated memory blocks (e.g. the updated first plurality of data blocks and the updated second plurality of parity blocks) to a stripe.

In step 612, the updated first data is stored in a second location of the shared fabric memory. The second location is adjacent to the first location. As described in other figures (FIG. 1A, for example), the free memory gap, in some examples, is located adjacent to the location of the original first data (i.e. the first plurality of data blocks and the second plurality of parity blocks). Therefore, when the updated first data is stored in the free memory gap (the second location), it is stored adjacent to the original first data (located at the first location).

In step 614, the process begins again for a second data. Second data is transmitted from a third location of the shared fabric memory adjacent to an updated location of the free memory gap (an updated second location). The updated location of the free memory gap and the location of the second data cause the execution to "ripple" through the shared fabric memory from one end to the opposite end of the shared fabric memory.

In step 616, a sweep iteration indicator is incremented from the currently completed sweep to the next sweep. Since the free memory gap has reached an end of the shared fabric memory, and all stripes have been updated into the currently completed sweep. In some examples, inter-sweep instructions are executed prior to initiating the next sweep.

Although the present disclosure has been described in detail, it should be understood that various changes, substitutions and alterations can be made without departing from the spirit and scope of the disclosure. Any use of the words "may" or "can" in respect to features of the disclosure indicates that certain embodiments include the feature and certain other embodiments do not include the feature, as is appropriate given the context. Any use of the words "or" and "and" in respect to features of the disclosure indicates that embodiments can contain any combination of the listed features, as is appropriate given the context.

Phrases and parentheticals beginning with "e.g." and "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A method, comprising:
   transmitting, from a first location of a shared fabric memory, first data comprising a first plurality of data blocks and a second plurality of parity blocks by:
      retrieving each of the first plurality of data blocks from a first set of memory devices of the shared fabric memory;
      retrieving each of the second plurality of parity blocks from a second set of memory devices of the shared fabric memory; and
      calculating the first data from the first plurality of data blocks and the second plurality of parity blocks;
   receiving, from a processing circuitry, updated first data, comprising an updated first plurality of data blocks and an updated second plurality of parity blocks;
   storing the updated first data in a second location of the shared fabric memory adjacent to the first location;
   transmitting, from a third location of the shared fabric memory adjacent to an updated second location, second data comprising a third plurality of data blocks and a fourth plurality of parity blocks.

2. The method of claim 1, further comprising incrementing a sweep iteration indicator.

3. The method of claim 1, wherein the first location of the shared fabric memory comprises a plurality of uniformly sized memory blocks each located in equivalent locations on each of a plurality of memory devices of the shared fabric memory.

4. The method of claim 3, wherein the first plurality of data blocks reside on a first portion of the plurality of uniformly sized memory blocks located on the first set of memory devices.

5. The method of claim 4, wherein the second plurality of parity blocks reside on a second portion of the plurality of uniformly sized memory blocks located on the second set of memory devices.

6. The method of claim 1, wherein the second location of the shared fabric memory is a free memory gap.

7. The method of claim 6, wherein the free memory gap advances to an adjacent location upon the updated first data being stored in the second location.

8. A shared fabric memory, comprising:
   a plurality of memory devices coupled to a processing circuitry, the plurality of memory devices to:
      transmit, to the processing circuitry, first data comprising data information and parity information, comprising:
         retrieving the data information from a first portion of a first plurality of memory blocks located on a first set of the plurality of memory devices;
         retrieving the parity information from a second portion of the first plurality of memory blocks located on a second set of the plurality of memory devices;
         calculating the first data from the data information and the parity information;
      receive, from the processing circuitry, updated first data, comprising updated data information and updated parity information;
      store the updated first data in a second plurality of memory blocks in a free memory gap of the shared fabric memory;
      advance the free memory gap of the shared fabric memory to a third plurality of memory blocks adjacent to the second plurality of memory blocks.

9. The shared fabric memory of claim 8, wherein memory blocks of the shared fabric memory, including the first plurality of memory blocks, the second plurality of memory blocks, and the third plurality of memory blocks, are uniformly sized.

10. The shared fabric memory of claim 8, wherein each data block of the first plurality of memory blocks is located at a uniform location on a respective memory device of the first set.

11. The shared fabric memory of claim 8, wherein the first data represents a sub-grid of a stencil code at a first sweep.

12. The shared fabric memory of claim 11, wherein the updated first data represents the sub-grid of the stencil code at a second sweep.

13. The shared fabric memory of claim 8, further comprising a plurality of local storages each corresponding to a processor of the processing circuitry.

14. The shared fabric memory of claim 13, wherein transmitting the first data further comprises transferring portions of the first data to each of the plurality of local storages, such that a first portion of the first data is transferred to a local storage corresponding to a processor executing a process that calculates an updated value for the first portion.

15. A high performance computing (HPC) system, comprising:
   a processing circuitry comprising a plurality of processors coupled to a plurality of local storages;
   a shared fabric memory comprising a plurality of memory devices coupled to the processing circuitry to:
      execute a first sweep of a stencil code by:
         sequentially retrieving a plurality of data stripes, wherein each successively retrieved data stripe of the plurality of data stripes is adjacent to an immediately previously retrieved data stripe;
         for each retrieved data stripe, substantially simultaneously updating a set of values of the retrieved data stripe;
         for each retrieved data stripe, storing the updated set of values in a free memory gap adjacent to the retrieved data stripe;
         for each retrieved data stripe, advancing the free memory gap to an adjacent memory location; and
         incrementing a sweep status indicator from the first sweep to a second sweep.

16. The HPC system of claim 15, wherein each of the plurality of data stripes includes a plurality of uniformly sized memory blocks, each located at a uniform location on a respective memory device of the plurality of memory devices.

17. The HPC system of claim 15, wherein each of the set of values is updated by a respective process executed by the processing circuitry.

18. The HPC system of claim 15, wherein the sweep status indicator indicates a direction the free memory gap advances through the shared fabric memory based on whether the sweep status indicator is an even number or an odd number.

19. The HPC system of claim 15, wherein each retrieved data stripe contains values for a subgrid of a matrix of cells of the stencil code.

20. The HPC system of claim 19, wherein executing the first sweep of the stencil code comprises updating all values of the matrix of cells from a first timestep to a second timestep.

* * * * *